(12) United States Patent
Miller et al.

(10) Patent No.: US 8,154,523 B2
(45) Date of Patent: Apr. 10, 2012

(54) ELECTRONIC DEVICE, DISPLAY AND TOUCH-SENSITIVE USER INTERFACE

(75) Inventors: Michael E. Miller, Honeoye Falls, NY (US); Jerald J. Muszak, Henrietta, NY (US); Michael J. Telek, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 1122 days.

(21) Appl. No.: 11/955,570

(22) Filed: Dec. 13, 2007

(65) Prior Publication Data

US 2009/0153438 A1    Jun. 18, 2009

(51) Int. Cl.
*G06F 3/03* (2006.01)
(52) U.S. Cl. .................................... 345/173; 715/708
(58) Field of Classification Search .................. 345/55, 345/173; 178/18.01; 455/575.1; 381/361; 379/433.06; 705/14.37, 14.4; 715/706, 708
See application file for complete search history.

(56) References Cited

U.S. PATENT DOCUMENTS

| | | | |
|---|---|---|---|
| 4,769,292 A | 9/1988 | Tang et al. | |
| 5,061,569 A | 10/1991 | VanSlyke et al. | |
| 6,563,479 B2 * | 5/2003 | Weindorf et al. | 345/77 |
| 6,680,749 B1 | 1/2004 | Anderson et al. | |
| 6,717,560 B2 | 4/2004 | Cok et al. | |
| 6,861,155 B2 | 3/2005 | Bawendi et al. | |
| 7,184,009 B2 | 2/2007 | Bergquist | |
| 7,312,791 B2 * | 12/2007 | Hoshino et al. | 345/173 |
| 7,388,571 B2 * | 6/2008 | Lowles et al. | 345/104 |
| 7,463,238 B2 * | 12/2008 | Funkhouser et al. | 345/107 |
| 7,692,638 B2 * | 4/2010 | Land et al. | 345/173 |
| 2002/0093492 A1 | 7/2002 | Baron | |
| 2006/0238517 A1 | 10/2006 | King et al. | |
| 2007/0046646 A1 | 3/2007 | Kwon et al. | |
| 2007/0152977 A1 | 7/2007 | Ng et al. | |

* cited by examiner

*Primary Examiner* — Abbas Abdulselam
(74) *Attorney, Agent, or Firm* — Roland R. Schindler; Nancy R. Simon

(57) ABSTRACT

Display devices and methods for operating the same are provided. In one embodiment, the display device has an electronic display having an active area for presenting visual content; a housing holding the electronic display and having an opening allowing a person to view a first portion of the active area; and a bezel about the opening, the bezel covering a second portion of the active area and providing a window through which at least a part of the second portion can be viewed. A sensor system senses when a person is close to touching the bezel or when a person is in touch with the bezel and generates a sensor signal; and a controller is operable to adjust the appearance of the active area in the part of the second portion when the controller determines that a person has touched the bezel or is close to touching the bezel.

20 Claims, 14 Drawing Sheets

ELECTRONIC DEVICE, DISPLAY AND TOUCH-SENSITIVE USER INTERFACE

FIELD OF THE INVENTION

The subject matter of the present disclosure relates to display device providing a touch user interface and to electronic devices that use the same.

BACKGROUND OF THE INVENTION

A wide variety of electronic devices employ a video display, such as a Liquid Crystal Display (LCD) or Organic Light-Emitting Diodes (OLED) display, and one or more input devices, which can be mechanically actuated (e.g., switches, buttons, keys, dials, joysticks, joy pads) or electrically activated (e.g., touch pads or touch screens). The display is typically framed by a bezel and configured to present visual content such as text and graphics, and the input devices are typically configured to perform operations such as issuing commands, making selections, or moving a cursor or selector within a display area of the display. Each of these well-known devices imposes design restrictions such as size and shape limitations, costs, functionality, complexity etc., that must be taken into account when designing the hand-held electronic device. In most cases, the display is an integral part of the user experience with the product by providing dynamic display of information such as status or feedback information or other visual content to the user.

This fact makes touch-sensitive interfaces, wherein the user selects or inputs information by touching a portion of the display, particularly compelling. Accordingly, such touch-sensitive display devices are commonly found hand-held electronic devices, including, for example, telephone receivers, PDAs, media players, remote controls, cameras, global positioning systems, portable computers, and kiosk displays.

A typical touch sensitive display system 1 of the prior art is shown in FIG. 1. In the example shown in FIGS. 1 and 2, the touch sensitive display system 1 comprises a housing which forms a bezel 2. Bezel 2 is configured with an opening 4 in which a display 6 is mounted, such that bezel 2 allows the user to view substantially all of an active viewing area of display 6.

FIG. 2 shows one example of a prior art display 6 of a type that is commonly used in the touch sensitive display system 2 shown in FIG. 1. As shown in FIG. 2, display 6 typically has many functional elements, including active viewing area 20, which is comprised of an array of light-emitting or light-modulating elements, a display support 22, and electrical connections for the column drivers 24 and electrical connections for the row drivers 26.

Referring again to FIG. 1, bezel 2 typically precludes the user from seeing the display housing 22 and electrical connections for the column drivers 24 and the row drivers 26. To perform this function, bezel 2 must be wide enough on at least two sides to cover the extent of the electrical connections, however, for aesthetic reasons, bezel 2 is typically equally wide along the two horizontal sides of the device and at least as wide along the vertical edges as the horizontal edges.

In devices employing touch screen technology, a substantially transparent cover plate 8 is typically provided to protect the display from mechanical stress and a touch-sensitive overlay 10 is positioned on cover plate 8. Touch-sensitive overlay 10 is typically not truly transparent, but instead is somewhat semi-transparent, and has the effect of absorbing some of the light generated by display 6, thereby reducing the effective luminance of images presented by display 6.

Further, touch-sensitive overlay 10, is typically made of materials that diffuse light that passes through it. This has the effect of reducing the perceived sharpness of an image presented by display 8 and, perhaps more importantly, diffusely reflects any light that impinges on this layer from the ambient environment. This diffuse reflection of ambient light detracts from the overall user experience and the value of the product as may be evidenced by the recent increase in sales of laptop personal computers that incorporate displays having highly specular front surfaces and the accompanying decrease in the sales of laptop computers having displays with highly diffused front surfaces.

One known way to remove the touch-sensitive overlay 10 from the display design is to include light-sensitive elements in the surface of display 6. For example, U.S. Pat. No. 7,184,009 to Bergquist, issued Feb. 27, 2007, entitled "Display circuit with optical sensor," and U.S. Pat. No. 6,717,560 to Cok et al., issued Apr. 6, 2004, entitled "Self-illuminating imaging device," provide discussions of displays having embedded light-sensitive elements that may be used for light sensing. Unfortunately, such display designs require that the circuitry for driving the display, the circuitry for sensing, and often the light-emissive elements of the display to share area on the display surface. Therefore, incorporating such elements into the display to enable a touch screen without providing a touch-sensitive overlay often requires the use of smaller light-emitting elements which often degrades the lifetime of displays such as OLED displays or reduces the power efficiency in displays employing light modulators, such as liquid crystal displays.

It will be appreciated that the use of any touch-screen technology requires the user to make physical contact with active viewing area 20 of display 6 and/or cover plate 8, or touch-sensitive overlay 10. Such contact can have undesirable consequences. For example, the act of touching the display can deposit oil, dirt and/or other contamination on the surface of the display 6, cover plate 8, and/or touch sensitive overlay 10 which can interfere with the optical performance of the display 6. Avoidance of surface contamination may be of particular concern when one of the primary purposes of the display 6 is to present images or video that are to be viewed for aesthetic or entertainment purposes. Further, any display which has an active viewing area 20 with a touch-sensitive surface must be robust to such touching to enable both reliable sensing of the contact and reliable operation of the display 6 and/or touch sensitive overly 10 over the useful life of the electronic device into which they are incorporated. This typically involves increasing the physical robustness requirements of the display 6, cover plate 8 and/or touch-sensitive overlay. These requirements can cause a substantial increase in the thickness, weight, complexity or the total system cost of the display system.

In a touch screen system, the above described sensing functions comprise only one portion of the overall graphical user interface provided using the touch-screen display. This is depicted on a touch-sensitive user interface contains several elements that are important to its operation. One such graphical user interface is shown in FIG. 3. Note that this graphical user interface typically contains informational messages 30, and typically two or more options 32a, 32b. Further, the graphical user interface typically consists of a user selection area 34a, 34b, which indicates the location of the physical area that must be touched to select an option.

Among the advantages of touch-sensitive interfaces, is that the options can be updated as they change or become relevant to the user. This is a significant improvement over interfaces having physical buttons that are inextricably tied to a single function. Instead, a single touch sensitive area can serve the function of 10s, 100s, or even 1000s of buttons containing fixed physical labels. Without the ability to adjust the user interface in this way, it would be basically impossible to provide the user with a large number of features or to enable multi-function devices.

It is also known, however, to employ fixed physical buttons in conjunction with a displayed image as described by U.S. Pat. No. 6,680,749 to Anderson et al., issued Jan. 20, 2004, entitled "Method and system for integrating an application user interface with a digital camera user interface," allowing the user to select among a few fixed options. Unfortunately, in these interfaces, the number of buttons is fixed and novice users sometimes have difficulty associating a physical button with an adjacent region on a screen since there is not a direct physical association or visual connection between the touch sensitive button and the option on the display. Further, this embodiment, requires a region of the display within the bezel to be allocated for depicting user interface options to the user and precludes the use of this portion of the display for displaying information, such as images.

King et al., in U.S. Application Publication No. 2006/0238517, entitled "Electronic Device Having Display and Surrounding Touch Sensitive Bezel for User Interface and Control", has discussed another option in which a display is positioned on the electronic device and having a perimeter or bezel; at least one touch sensitive surface is positioned on the electronic device adjacent at least a portion of the perimeter of the display; and processing circuitry is connected to the display and the touch sensitive surface. Within this device, the processing circuitry designates at least one area of the at least one touch sensitive surface for at least one control; generates at least one visual guide for the at least one control; and presents the at least one visual guide for display at a location on the display adjacent the at least one area designated for the at least one control. Note that in this embodiment, the visual guide is located on the display inside the bezel but indicates a touch-sensitive surface that is located on the bezel. While this solution overcomes many of the stated problems with existing touch sensitive and button interfaces, it requires that a portion of the display area inside of the bezel be allocated for user interface options and again requires the user to associate an area outside the display with an option that is on the display.

Each of these solutions has additional problems within certain applications. For example, some products, such as digital picture frames, serve a primary function of providing aesthetically pleasing decoration, including an image and a decorative frame. Therefore, it is undesirable to place physical buttons onto the frame or digital touch overlays over the image. However, it is often important for the user to interact with such products to change attributes such as which images are displayed, how they are displayed, or to load new images into the memory of the digital picture frame. Therefore, it is necessary to provide an interface that is invisible to the user when the product is providing its primary function of providing an aesthetically pleasing decoration while also providing an intuitive user interface that may be accessed when the frame is hung on the wall. The prior art does not provide a solution for such a problem.

Therefore, there is a need for an improved user interface that allows the dynamic display and touch-sensitive selection of context-sensitive user controls without applying a touch-sensitive overlay to the portion of the display area inside the opening of the bezel but allowing the direct association of these context-sensitive user controls with touch sensitive areas. Further, such an interface should not be visible during the products primary mode of operation and yet be intuitive to use.

SUMMARY OF THE INVENTION

Display devices and methods for operating the same are provided. In one embodiment, the display device has an electronic display having an active area for presenting visual content to a person; a housing defining an area for holding the electronic display and having an opening allowing the person to view a first portion of the active area; and a bezel about the opening, the bezel covering a second portion of the active area and providing a window through which at least a part of the second portion can be viewed. A sensor system is provided having a sensor that is adapted to sense conditions from which it can be determined when the person is close to touching the bezel or to sense when the person is in touch with the bezel and to generate a sensor signal indicative of the sensed conditions; and a controller is operable to receive the sensor signal and to adjust the appearance of the active area of the display in the part of the second portion that can be viewed through the window when the controller determines that the sensor signal indicates when the person has touched the bezel or is close to touching the bezel.

DETAILED DESCRIPTION OF THE INVENTION

Figure 4A:
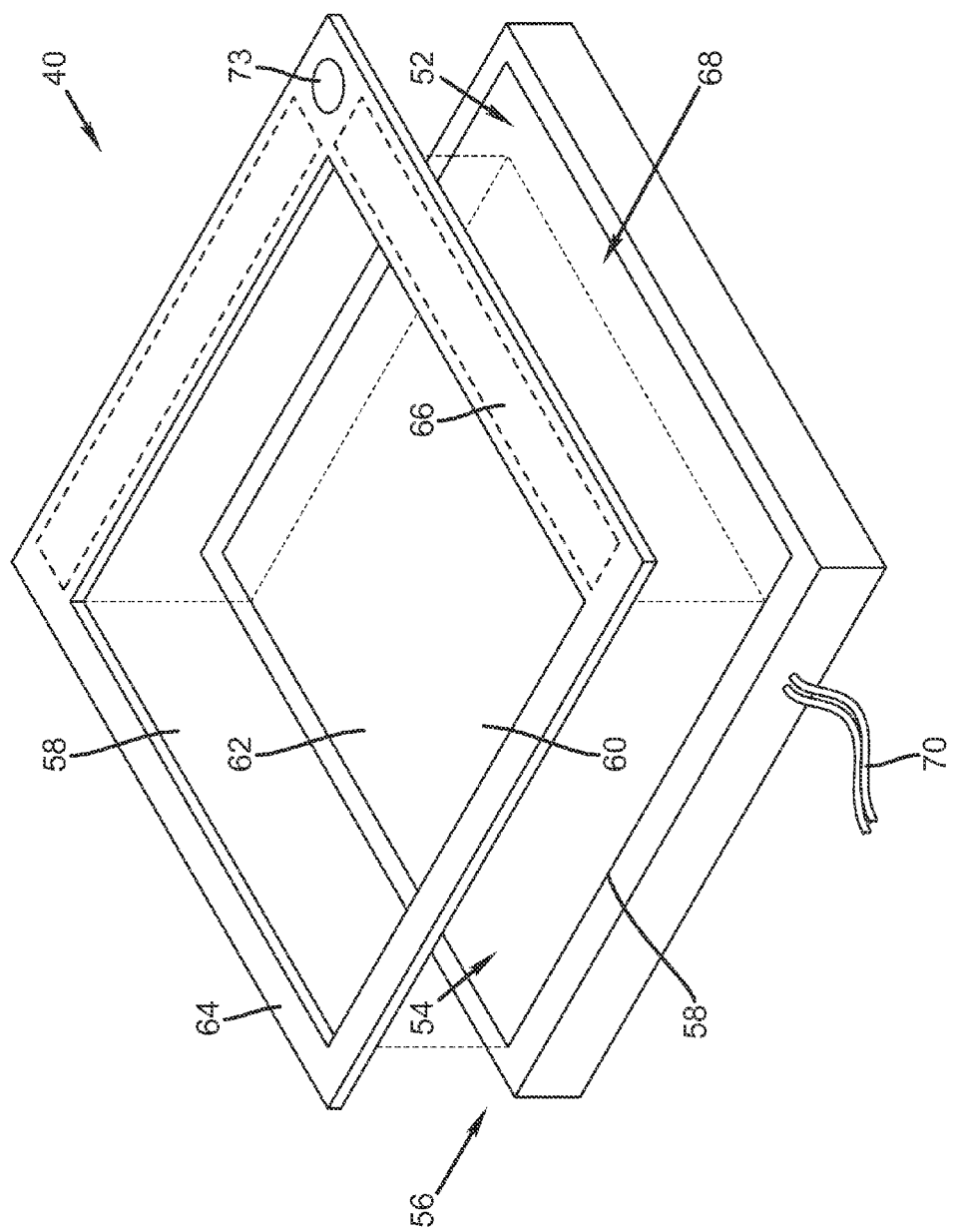
FIG. 4A is a schematic diagram of a display device.
Figure 4B:
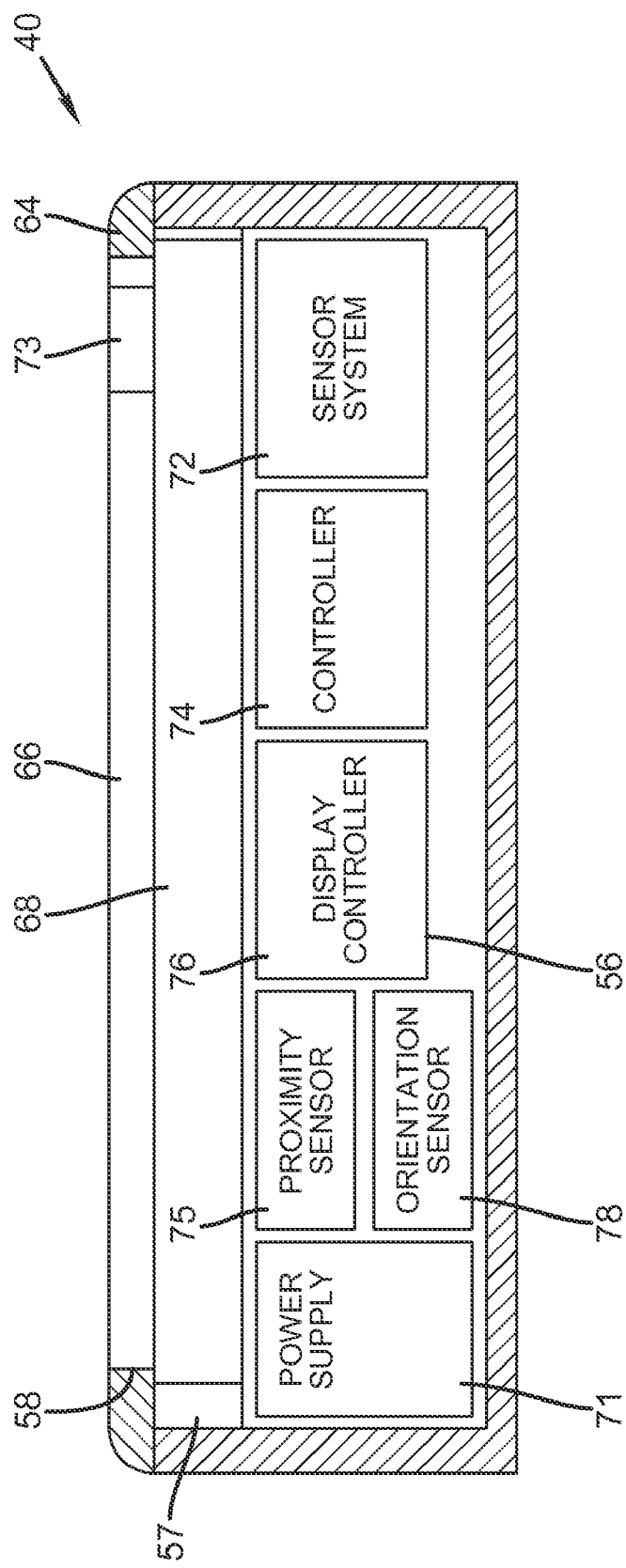
FIG. 4B is a schematic sectional view of the display device of FIG. 4A.

FIGS. 4A and 4B show a first embodiment of a display device 40. In this embodiment, display device 40 has a display 52 with an active area 54 for presenting visual content to a person. Display 52 can comprise any known device for presenting visual content across an area and can comprise, but is not limited to, a liquid crystal display, a cathode ray tube, an electroluminescent display, an Organic Light Emitting Diode display, or a SED display. As used herein the term visual content includes but is not limited to information that can be presented on any form of display 52, including but not limited to still images, sequences of still images, video sequences and video segments, text, graphics, colors, patterns and icons.

As is also shown in FIGS. 4A and 4B, display device 40 has a housing 56 that defines an area 57 for holding display 52 and which provides an opening 58 that allows the person to view active area 54 of display 52. Opening 58 can provide an open space to expose display 52 or can comprise a protective transparent area to protect display 52 from direct exposure as desired.

A bezel 64 is positioned about opening 58 with bezel 64 providing a window 66 over a first portion 62 of active area 54 through which at least a part of second portion 68 can be viewed and covering a second portion 68 of active area 54.

A sensor system 72 is provided having a sensor 73 adapted to sense conditions from which it can be determined when the person is close to touching bezel 64 or to sense when the person is in touch with bezel 64 and to generate a sensor system signal indicative of the sensed conditions.

Sensor 73 can be positioned on bezel 64 in display 52 or in any other convenient location that enables sensor 73 to sense such conditions. Sensor 73 which can comprise any type of sensor known in the sensing arts and which can be used for the purposes described herein. For example, and without limitation, sensor system 72 can have a sensor 73 in the form of a contact switch, an electrostatic switch, an electro-optical switch, a light sensors, an electronic imager, sonic sensor so called Hall effect sensor, a capacitive sensor, electrostatic sensor, pressure sensor. Sensor system 72 can also optionally include any known circuit or system that can be used to convert signals received from sensor 73 into a sensor system signal having a preferred signal characteristics and can include for example and without limitation amplifiers, filters, analog to digital converts, latches, and buffers. Various embodiments of sensor system 72 and/or sensor 73 will be described in greater detail below.

In the embodiments shown in FIGS. 4A-4B, a controller 74 controls display device 40 at least in part in response the sensor system signal. Controller 74 can take any of a variety of forms, including but not limited to a micro-processor, micro-computer, micro-controller, or any programmable processing device, programmable analog circuits, or a hardwired control circuit or circuits. Controller 74 is adapted to use the active area 54 of display 52 to present images, text or other visually perceptible output.

In the embodiment of FIGS. 4A and 4B, controller 74 is programmed, connected or otherwise adapted to determine when the sensor system signal indicates that the person is in touch with or is close to touching bezel 64 (for example when a finger or other object is positioned within an inch of bezel 64). When controller 74 makes such a determination, controller 74, changes the appearance of active area 54 of display 52 in the part of the second portion 68 that can be viewed through window 66. Controller 74 can adjust the appearance of active area 54 by directly providing signals to operate display 52. Alternatively, controller 74 can generate signals that are transmitted to other control processors such as an optional display controller 76 which in turn generate control signals that drive display 52 to adjust the appearance of active area 54 in the part of the second portion 68 that can be viewed through window 66.

Controller 74 can adjust the appearance of active area 54 of display 52 in the part of the second portion 68 that can be viewed through window 66 in any of a variety of ways. In some embodiments, the adjustment can comprise a transition from a non-illuminating state to an illuminating state. For example, when a touch or near touch is detected the viewable part of the second portion can illuminate briefly to indicate to the person that a touch or near touch has been detected. Alternatively, the illuminated portion can remain illuminated until another touch or near touch is detected. In still another embodiment, the adjustment in the appearance of active area 54 can comprise a change in color or the presenting of information such as graphics symbols or text. For example, in this embodiment, second portion 68 can be used to present visual content in the form of interaction information that facilitates transactions between the person and display device 40. It will be appreciated that these examples are non-limiting and that the adjustment to the appearance of active area 54 of display 52 in the part of the second portion 68 that can be viewed through window 66 can take any form so long as it is possible for the person to determine that such a change in appearance has been made. In many embodiments this change should be readily apparent, however, in certain embodiments it may be desirable to provide a more subtle change in appearance.

It should be noted that in a such a display device 40, the presentation of interaction information and touch-sensitive selection of context-sensitive user controls of a conventional a user interface and display are provided without applying a touch-sensitive overlay to the portion of the display area inside the window 66 of bezel 64. Further, display device 40 allows the direct association of these context-sensitive user controls with touch sensitive areas without requiring contact directly with display 52.

In the embodiments disclosed herein, bezel 64, window 66, display 52 and controller 74 can be operated to provide a readily noticeable adjustment in appearance such as by presenting interaction information on bezel 64 during some time intervals and yet provide an aesthetically pleasing and unobtrusive decorative appearance in the same regions of bezel 64 during other time intervals. For example, in some embodiments, controller 74 will automatically deactivate second portion 68 of active area 54 at a predetermined time interval after controller 74 senses that the person has last touched bezel 64 or was last close to touching bezel 64. Therefore, after the person has stopped interacting with display device 40 light emission through window 66 is discontinued so that this portion of bezel 64 is less distinguishable or is undistinguishable from other portions of bezel 64 to provide an observer an aesthetically pleasing, decorative display device 40 that does not distract attention from the visual content being presented by display 52 during periods where there is no interaction with the display.

In another embodiment, controller 74 can be programmed or otherwise adapted to determine, from the sensor signal, that the person has stopped interacting with display device 40, and can modify light emission through window 66 so that such light emission is made in a form that actively camouflages the appearance of window 66, or that is otherwise light emissive but that makes portions of bezel 64, that contain window 66, have an appearance that is less distinguishable or undistinguishable from the appearance of the other portions of bezel 64.

In certain embodiments, it is desirable that the adjustment in the appearance of second portion 68 will become visible anytime that sensor system 72 detects conditions that controller 74 can determine are indicative of the proximity of a person who is positioned to view information that is displayable by display device 40, but who is not yet touching or about to touch bezel 64. There are a variety of presence indicating conditions that can be detected that are indicative of such a situation. For example, and without limitation, infrared signals, light or sonic reflections, ambient noise or vibration, or other conditions in an area in which display 52 can present image information that can be sensed.

Figure 5:
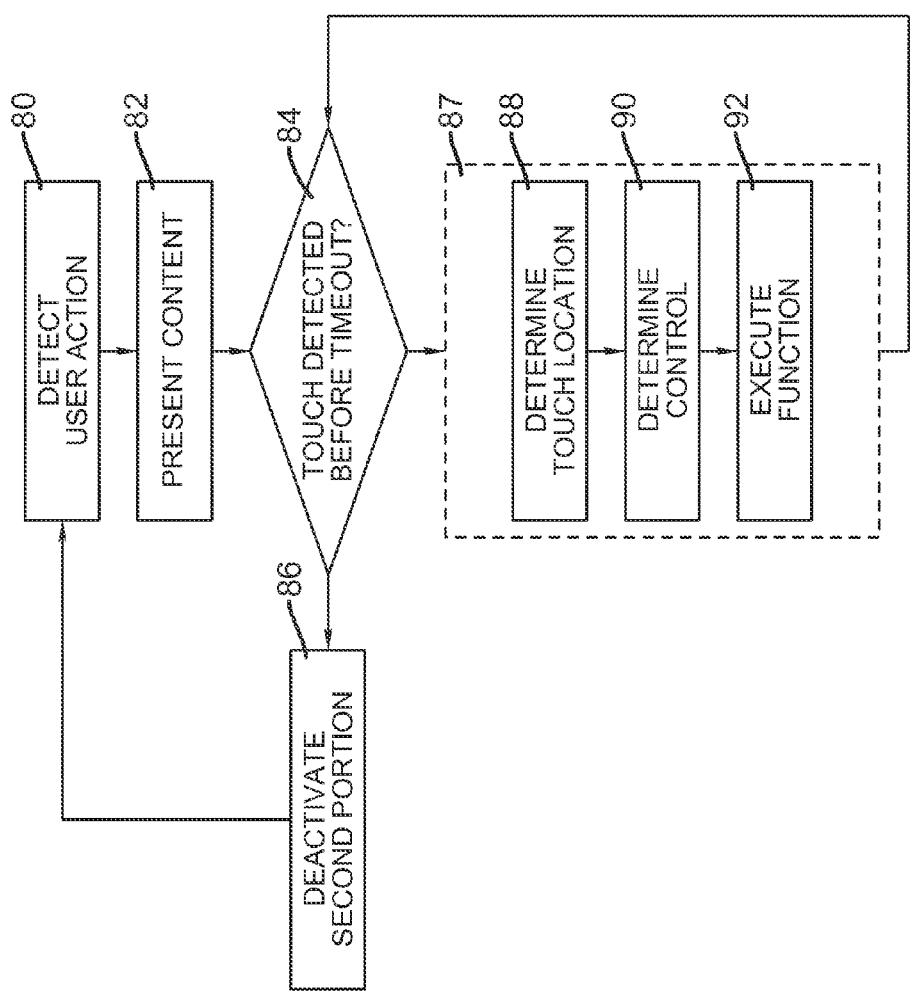
FIG. 5 is a flow diagram of one embodiment method for operating a display device.

In one embodiment, sensor 73 that is otherwise used to detect when a person is in contact with bezel 64 or is close to touching bezel 64 can also be used as a proximity sensor to sense when such conditions exist. For example, where sensor 73 is adapted to optically detect touch, such optical detection can be used to sense the presence of a person within area within which display 52 can present image information. Alternatively, as is indicated in FIG. 5, a separate proximity sensor 75 can be provided whose purpose is to detect conditions indicating the approach of a person at a distance that is greater than a distance of a sensor 73 and that generates a proximity signal based upon the detected conditions. Any known form of sensor including, but not limited to, light sensors, sonic sensors, imagers, electromagnetic sensors, vibration sensors and the like can be used for proximity sensor 75.

In such embodiments, controller 74 can be adapted to activate one or more pixels within the active area of the display in the part of the second portion 68 that can be viewed through window 66, for example, by transitioning from a state that does not radiate light that is readily apparent to the person to a state that does radiate light that is readily apparent to the person when the active area of the display in the second portion is deactivated and the controller receives a signal from the one or more interface sensors 73 and/or proximity sensors 75 generate a signal from which controller 74 can infer that the person wishes to interact with display device 40.

In one embodiment, window 66 is semi-transparent, such that light provided by display 52 can pass through window 66 from display 52. This allows light generated by second portion 68 to be provided to the person anytime that display 52 is active. However, in this embodiment, window 66 can be made sufficiently semi-transparent such that when the active area of the display in the part of the second portion 68 does not emit light, the reflectance of the bezel 64 is uniform inside and outside the window 66. Accordingly, display device 40 can provide a functional interactive human interface when activated so that light that is emitted by second portion 68 can be viewed and that can unobtrusively provide an aesthetically pleasing, decorative display device anytime that active area 54 of display 52 in the part of the second portion 68 does not emit light.

It should be noted that in certain embodiments, it may be productive to provide a window 66 that is semi-transparent and yet, when bezel 64 is affixed about display 52, the portion of bezel 64 that is adjacent to and outside of window 66 and the window 66 do not differ in reflectance. To accomplish this, a first material may be selected from which to form bezel 64, wherein this first material is semi-transparent. Many semi-transparent materials are known and commercially available. One such material is Surlyn 9721, available from DuPont. Such polymers may further be doped with low concentrations of pigments or colored polymeric beads to provide a bezel 64 having a desired color. Bezel 64 can be formed from this first material.

A second material is then selected having optical characteristics that are similar to the optical characteristics of active area 60 of display 52, within active area 60 of display in the part of the second portion 68. For example, displays formed from organic light-emitting diodes (OLEDs) are often opaque and employ a rear electrode made of relatively high reflectivity aluminum or silver on which are deposited relatively transparent materials but then employ a circular polarizer which reduces the diffuse reflectance of the display to less than a few percent. Therefore, a second material, which is opaque and has a reflectance of less than a few percent may be chosen if the active area of display 52 in the part of the second portion 68 is to be an OLED with a circular polarizer.

If the same display 52 was not to be equipped with such a circular polarizer in active area 54 of display 52 in the part of the second portion 68, the second material should be opaque and have a reflectance near the reflectance of the OLED display without the polarizer, which is typically around 70%. This second material can then applied over the entire inside of bezel 64 with the exception of the area designated to provide a window 66. Once this is complete, bezel 64 will include windows 66 through which the active area of the display in the part of the second portion 68 may be viewed. For example, the inside of bezel 64 can be painted using a black paint if the display is an OLED with a circular polarizer or a silver paint if the display is an OLED without a circular polarizer. However, this painting step must be performed in a way that the paint does not come in contact with the region of bezel 64, which is selected to provide window 66. This may be accomplished, for example, by applying an adhesive mask to window 66 portions of bezel 64 before painting and removing this adhesive mask after the paint has been dried.

In another embodiment, window 66 can be formed within bezel 64 by providing a material having an electrically switchable object which is capable of changing opacity as a function of an electrical signal. For example, window can be formed from an array of elements employing electrowetting technology, such as the colormatch technology provided by Liquavista. Within this technology, dies or pigments are placed into a solution and this solution may be moved into or out of at least a portion of the plane of window 66 through electrical switching. Within this embodiment, window 66 can be formed as an electrowetting display, matching the pigments or dyes within the electrowetting display to the colors of the remainder of bezel 64 and treating the front surface of window 66 to have similar surface properties as the remainder of bezel 64. The electrowetting display is then inserted into a hole within an opaque bezel. By switching the electrowetting display to be opaque when the second portion 68 of the active area is disabled and transparent when the second portion 68 of the active area emits light.

Display 52 can employ any known display technology including liquid crystal display or electroluminescent displays such as organic light emitting displays, AC thin films, or displays employing quantum dots. Further, in some non-portable applications, additional technologies such as plasma may be applied. The CRT type of display 52 can be masked such that any light created within a backlight unit or within display 52 is not emitted through any surface other than the front of display 52, such that it does not inadvertently create light that illuminates the internal portion of device 40. Typically, any portion of display 52 that is placed under bezel 64 will emit or modulate light from a backlight. Similar display 52 can also be positioned to be directly viewed through the opening 58, however, reflective technologies, such as electrochromic, electrophoretic, electroplating, electrowetting, or MEMs or other display technologies can be applied.

In this device, first portion of active area 54 of display 52 is positioned such that it can be viewed directly through opening 58. That is display 52 is mounted in housing 56 such that it can be viewed directly or viewed through an optional cover plate (not shown) that is substantially transparent. However, at least a second portion 68 of the active area of at least one of the electronic displays 52 is positioned to be viewed through a portion of bezel 64.

Second portion 68 of the active area 54 of display 52 is positioned to be viewed through bezel 64 is capable of displaying a broad range of visual information including, but not limited to, text and/or icons. As such, this second portion 68 can be pixellated and be capable of presenting visual elements by applying a matrix of active pixels which can, for example and without limitation, be a 7 pixel by 7 pixel display.

Sensor system 72 can include one or more sensors for providing different functions within the device. Such sensors include at least one sensor 73 that is capable of determining when a person touches or is close to touch bezel 64. Typically, sensor 73 will be capable of determining at least when the person touches a region of the window 66, which corresponds to an underlying text or graphic element that is displayed in the part of the second portion 68 of the active area of the display. In one embodiment, sensor system 72 can include an optical type of sensor 73 that is constructed from thin film transistors within the display device itself. Sensors 73 of this type are known to be employed in liquid crystal and OLED displays for simply detecting a change in reflected light within a region of display 52 whenever the display's light output is unchanged and whenever the light only changes within one of many regions of the display. Other optical sensors may also be embedded between display 52 and the front surface of bezel 64 for detecting similar changes in light.

In another embodiment, sensor system 72 can incorporate a sensor 73 that is in the form of a touch-sensitive overlay which can be provided on the top surface of bezel 64. In an alternative embodiment, sensor system 72 has a sensor 73 that is in the form of a surface that can sense when the surface is deflected or moved by the person to enable the person to indicate a selection. Thin film device structures to bezel 64 to enable either "resistive" or "capacitive" touch surfaces, form another example of a touch-sensitive overlay. In the resistive category, the touch-sensitive overlay is coated with a thin metallic electrically conductive layer and a resistive layer. When the touch-sensitive overlay is touched, the conductive layers come into contact through the resistive layer causing a change in resistance (typically measured as a change in current) that is used to identify where on the touch-sensitive overlay the touch event occurred.

In the capacitive category, a first set of conductive traces run in a first direction on the touch-sensitive overlay and are insulated by a dielectric insulator from a second set of conductive traces running in a second direction (generally orthogonal to the first direction) on the touch-sensitive overlay. The grid formed by the overlapping conductive traces creates an array of capacitors that can store electrical charge. When an object (e.g., a person's finger) is brought into proximity or contact with the touch-sensitive overlay, the capacitance of the capacitors at that location changes. This change can then be used to identify the location of the touch event. It should also be noted that the conductive traces can be embedded within bezel 64 and can be formed as part of bezel 64, sensor system 72 can also include other types of sensors 73. For example, various sensors 73 are known that rely on nonvisible electromagnetic radiation and respond to a change in the field of the electromagnetic radiation to determine when an object is close to sensor 73. Further, sensor system 72 can include an optical sensor 73 that senses proximity or location information about individuals in the room. For example, sensor 73 can include a visible light camera that performs change detection and determines the proximity of a person through the detection of motion and the size of the object that is in motion.

Controller 74 can be any device that is capable of receiving the sensor signal from sensor system 72 and directly, or indirectly, causing a change in the appearance of second portion 68 of active area 54 of display 52 in response to the presence or absence of this signal. For example, controller 74 can receive a signal indicating that the person has touched a portion of bezel 64 and provide a command to display 52 or a display controller for causing a change in the appearance of display 52 within second portion 68 of the active area of display 52. In another example, controller 74 may not receive a signal from the one or more sensors 73 for some predetermined time and in response will cause display 52 to remove any information presented within second portion 68. In another example, controller 74 can receive a signal indicating the proximity of a person to display device 40 and provide a command to the display to change the appearance of second portion 68 of active area 54 of display 52 in a manner which indicates to the person that contact with portions of bezel 64 will be interpreted as a form of input.

Controller 74 can be configured to perform a number of steps including: designating at least one area a touch sensitive surface for at least one control; controlling a second portion of the active area, to provide a visual guide indicating a spatial location on the touch-sensitive surface; obtaining touch data from the at least one touch sensitive surface; and determining if the obtained touch data should invoke the control. More typically, display device 40 will comprise a controller 74 which is configured to: interpret contact or close to contact of a person with one or more areas of a sensor system 72 having a touch sensitive surface as a control input invoking a particular user input control and to control the second portion 68 of active area 54; and a spatial location on the touch-sensitive surface control to provide a visual guide indicating the spatial location of each of the touch sensitive controls on the touch-sensitive surface but inputs a signal to the remaining interface controls to minimize the transmission of luminance through the window. Through this process, controller 74 will control the portion of display 52 under bezel 64 to present a graphical element underlying each region, indicating the function of each of the user controls such that when the person touches bezel 64 above the user control that is depicted on the portion of display 52 under window 66, controller 74 will register this touch location with the user control, allowing this control to be activated. The processing circuitry is configured to initiate at least one operation for the electronic device based on the at least one determined control.

As shown in FIGS. 4A and 4B, a display device 40 incorporates one display 52 wherein a first portion 62 of electronic display 52 is viewed through opening 58 and a second portion 68 of electronic display 52 is viewed through window 66 in bezel 64. Notice further that display 52 is comprised of an electronic connection 70 that will typically extend beyond the left and top of active area 54 of the display. However, these same electrical connections are not present on at least a second side of display 52. Typically, bezel 64 is provided to hide these electrical connections from the person and must have at least a minimum size to allow space for these connections. Because connection 70 does not exist on the other side of display device 40, bezel 64 could theoretically be much thinner on this side of display 52. However, due to aesthetic concerns, bezel 64 is typically of equal size on each side of display 52. Therefore, it is possible to extend display 52 under bezel 64 on this side of display device 40 and to provide a sensor 73 comprising touch-sensitive surface type sensor 73 on bezel 64 adjacent to one of the sides opposing the electrical connections without further increasing the size of the display device 40, a concern that is present in most hand-held electronic devices. Notice that since the electrical connections typically extend from two sides of display 52, this same advantage may be obtained wherein sensor 73 comprises a touch-sensitive surface that is provided on at least two portions of bezel 64 around the perimeter of the opening.

Such a display device 40 can further comprise an optional orientation sensor 78. Orientation sensor 78 can be connected to controller 74 and used by controller 74 to determine an orientation of display device 40. Further render information on second portion 68 of active area 54 under bezel 64 based upon signals from orientation sensor 78. For example, when text, symbols or icons are rendered in second portion 68, the orientation of such text, symbols or icons may rotate as display device 40 is rotated.

As is also shown in FIG. 4B display device 40 has a power supply 71 to provide power for use by the various other components of display 50. Power supply 71 can comprise any known source of power including, but not limited to, power conversion circuits such as AC/DC converters, power storage devices such as batteries or fuel cells, or power generators such as electromechanical or photovoltaic power generators.

Figure 4C:
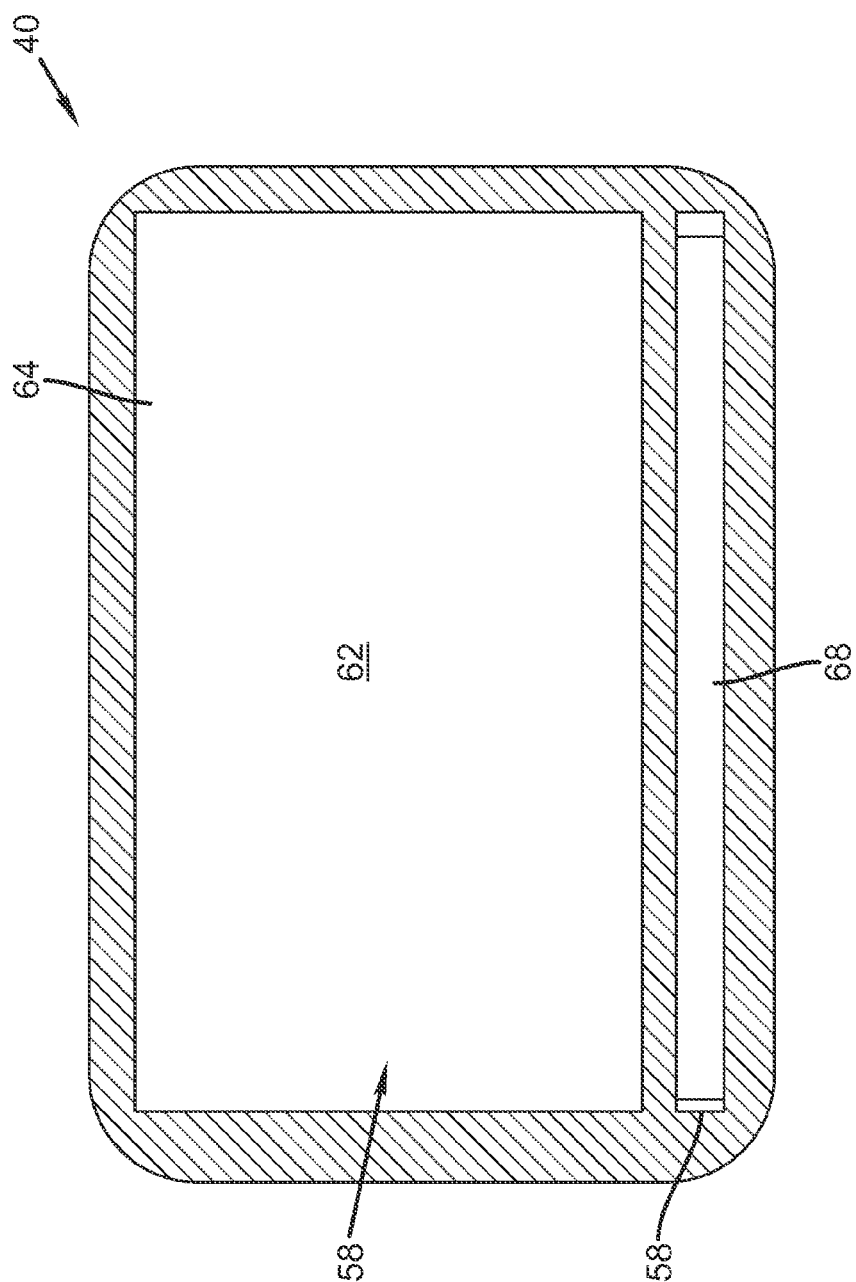
FIG. 4C is a frontal view of the display device of FIGS. 4A and 4B.

FIG. 4C illustrates an assembled frontal view of the embodiment of display device 40 of FIGS. 4A and 4B. In this embodiment, display device 40 has a display 52 and a touch-sensitive overlay type sensor 73, wherein a portion of display 52 is viewed through a portion of touch-sensitive type sensor 73.

FIG. 5 illustrates one embodiment of a method for operating a display device such as display device 40 of FIGS. 4A, 4B and 4C. As is illustrated in FIG. 5, when a person is detected touching bezel 64 or being close to touching bezel 64, sensor system 70 sends signals to controller 74 which interprets these signals as a desire to interact with display device 40 (step 80). In one embodiment, this step can include an optional substep of receiving a signal from presence proximity sensor 75 indicating that a person is in an area wherein the person can view what is presented on first portion 62 of active area 54. Controller 74 then activates a part of second portion 68 of active area 54 of display 52 to present content on second portion 68 of active area 54 of display 52 to designate one or more areas that the person can touch to activate one or more controls of display device 40 (step 82). Controller 74 then waits for a signal from sensor system 72 while monitoring the passage of time. A decision is made as to whether the person touches bezel 64 or is close to touching bezel 64 before a predetermined time passes (step 84). If not, the controller 74 disables second portion 68 of display device 40 (step 86). However, where it is determined that a person touches bezel 64 or is close to touching bezel 64 before the predetermined time interval is over, controller 74 executes a control response 87 that at least causes second portion 68 to change in appearance. In this example, it will be assumed that sensor system 72 and sensor 73 are capable of providing a sensor system signal that can indicate which portion of bezel 64 has been contacted. Where such optional information is available, control response 87 includes determining the area of bezel 64 touched by the person (step 88). Based upon this touch location and optional information about the content that was presented, controller 74 selects a control function to be performed from a plurality of control function responses (step 90). Controller 74 then executes this function (step 92) and returns to the step of touch detection (step 84). The control function will include causing some form of change in the appearance of second portion 68.

Figure 6:
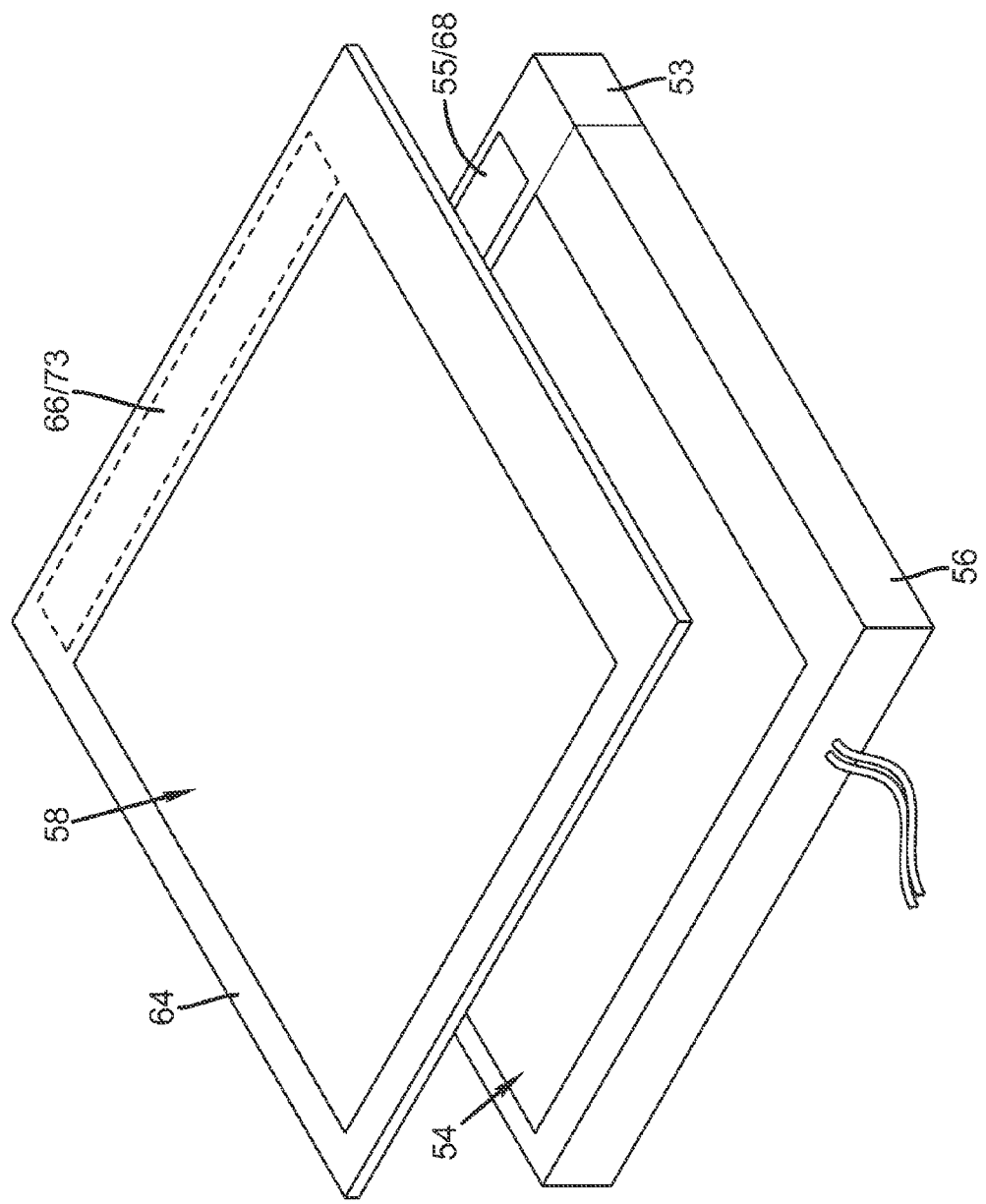
FIG. 6 is a schematic diagram showing an exploded view of a device useful in practicing the present invention.

It will be appreciated that there are many other possible embodiments of display device 40. First, although display device 40 can be implemented using a single display 52, it may alternatively be implemented using multiple electronic displays. One such device configuration is depicted in FIG. 6. As shown in FIG. 6, display device 40 has two displays 52 and 53, each having their own active area 54 and 55. In one such embodiment, active area 54 of first display 52 is viewed through opening 58 of bezel 64, while active area 55 of second display 53 is then positioned to be viewed through a window 66 in bezel 64 and present graphic or textual information which may be associated with display 53 on bezel 64 as described elsewhere.

Figure 7:
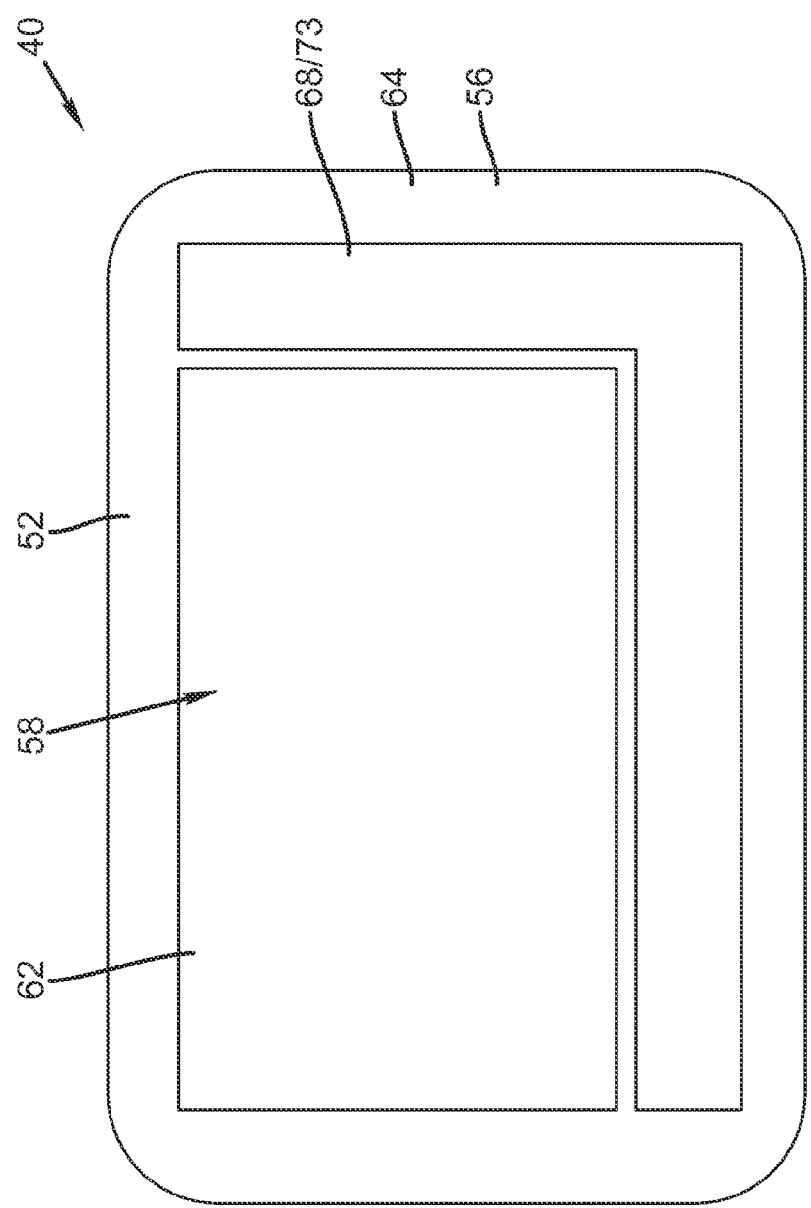
FIG. 7 is a schematic diagram depicting another example of a display device.

Although display device 40 can employ any display 52 as discussed earlier, display device 40 can benefit from using a specialized display 52. That is, it may be desirable to construct a display 52 specifically for use in a display device 40 such as shown in FIG. 7A. As shown in FIG. 7A, display 52 has a first portion 62 which is designed to be viewed through display 50 and, at least a second portion 68 of display 52 that is designed to be viewed through window 66 as may be necessary through sensor 73. In such a device, display device 40 can include a first display 52 that is comprised of an array of light-emitting elements which output light having a first peak luminance and a second portion 68 that is comprised of an array of light-emitting elements which output light having a second peak luminance, the second peak luminance being higher than the first. This will allow second portion 68 to output higher luminance within the region that is to be positioned under bezel 64 and sensor 73 so that the luminance emitted through bezel 64 will be approximately equal to the luminance of first portion 62 of display 50 as viewed through opening 58. It will be appreciated that a similar result can be achieved using separate displays as described in FIG. 6.

Figure 8A:
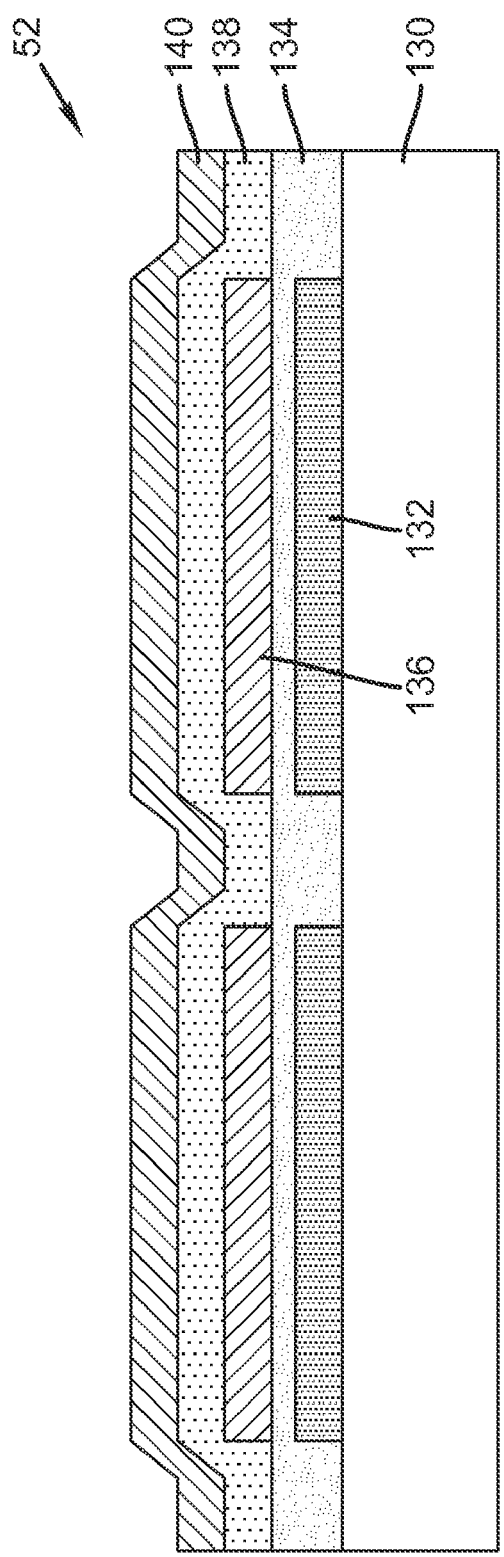
FIG. 8A is a cross-sectional diagram of a portion of an electroluminescent display having color filters.

To achieve the higher luminance output under bezel 64 and/or sensor 73, numerous modifications can be made to display 52. In one embodiment, first portion 62 of display 52 can have an array of light-emitting elements as depicted in FIG. 8A. As shown in FIG. 8A, display 52 can be of an electroluminescent type that is comprised of a substrate 130, an array of color filters 132, a planarization layer 134 a first electrode layer 136, an electroluminescent layer 138 and a second electrode layer 140. In such an embodiment, color filters 132 are formed within first portion 62 of display 52 and have a different density or thickness as compared to color filters 132 that are formed within second portion 68 of display 52. Specifically, the density or thickness of color filters 132 formed within second portion 68 of display 52 can be less than the density or thickness of color filters 132 formed within first portion 62 of display 52, such that color filters 132 within second portion 68 of display 52 absorb less of the light emitted within display 52 (e.g., by the electroluminescent layer 138) than color filters 132 in first portion 62 of display 52.

Figure 8B:
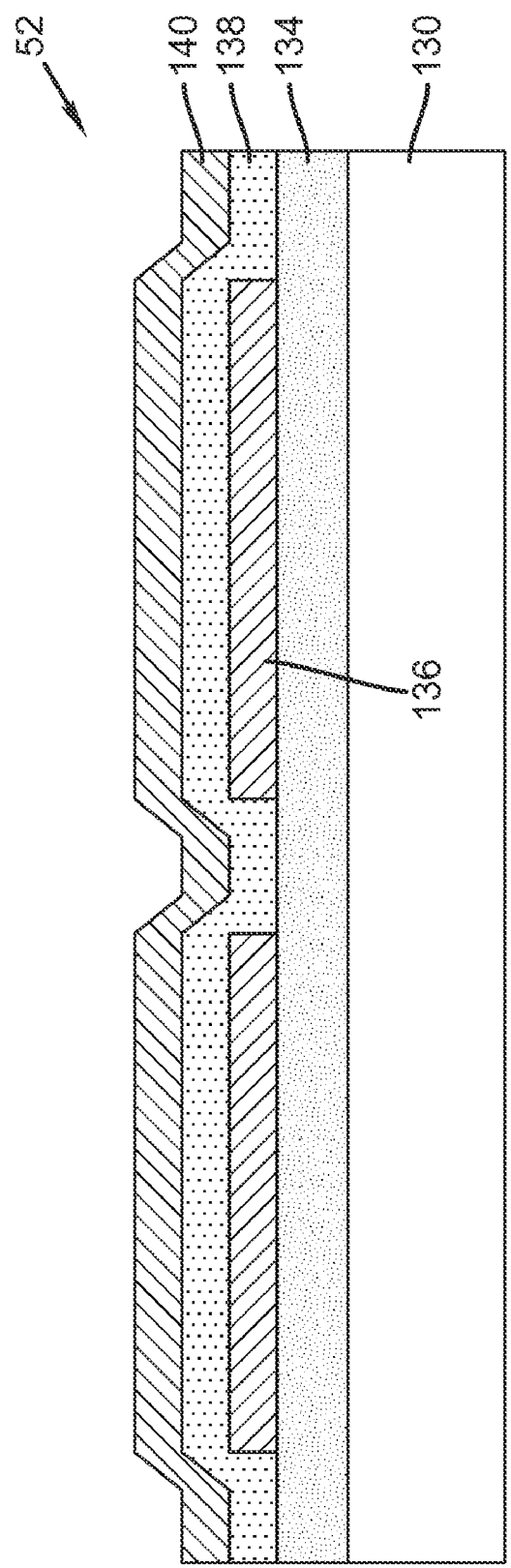
FIG. 8B is a cross sectional diagram of a portion of an electroluminescent display without color filters.

In another embodiment, first portion 62 of display 52 has an array of light-emitting elements that are comprised of a first set of color filters 132 as shown in FIG. 8A and the second portion 68 of display 52 can have light-emitting elements without color filters 132 as shown in FIG. 8B. Note that FIG. 8B includes a substrate 130, a planarization layer 134, a first electrode layer 136, an electroluminescent layer 138 and a second electrode layer 140 but does not contain an array of color filters 132. Also note, that in a bottom-emitting electroluminescent layer as depicted in each of FIGS. 8A and 8B, it is important to include planarization layer 134 simply to insure a flat surface between the first portion 62 of display 52 and the second portion 68 of display 52 on which to deposit the subsequent layers of the display. As in the previous embodiment, color filters 132 will absorb more light from first portion of display 52 that is viewed through opening 58 than in the second portion of display 52 that is viewed through window 66, providing an increased luminance within the second portion of the display, that may be absorbed by the semi-transparent window 66 without reducing the perceived luminance of the image within the second portion 68 of display 52 with regard to first portion 62 of display 52

Each of these methods result in a display wherein first portion 62 of display 52 is comprised of an array of light-emitting elements, which have a first density and a second portion 68 of display 52, which is comprised of an array of light-emitting elements having a second density. Preferably the first density is higher than the second density and will have a smaller opening. In this configuration, the portion of display 52 having the larger opening will typically be higher in luminance.

Figure 9:
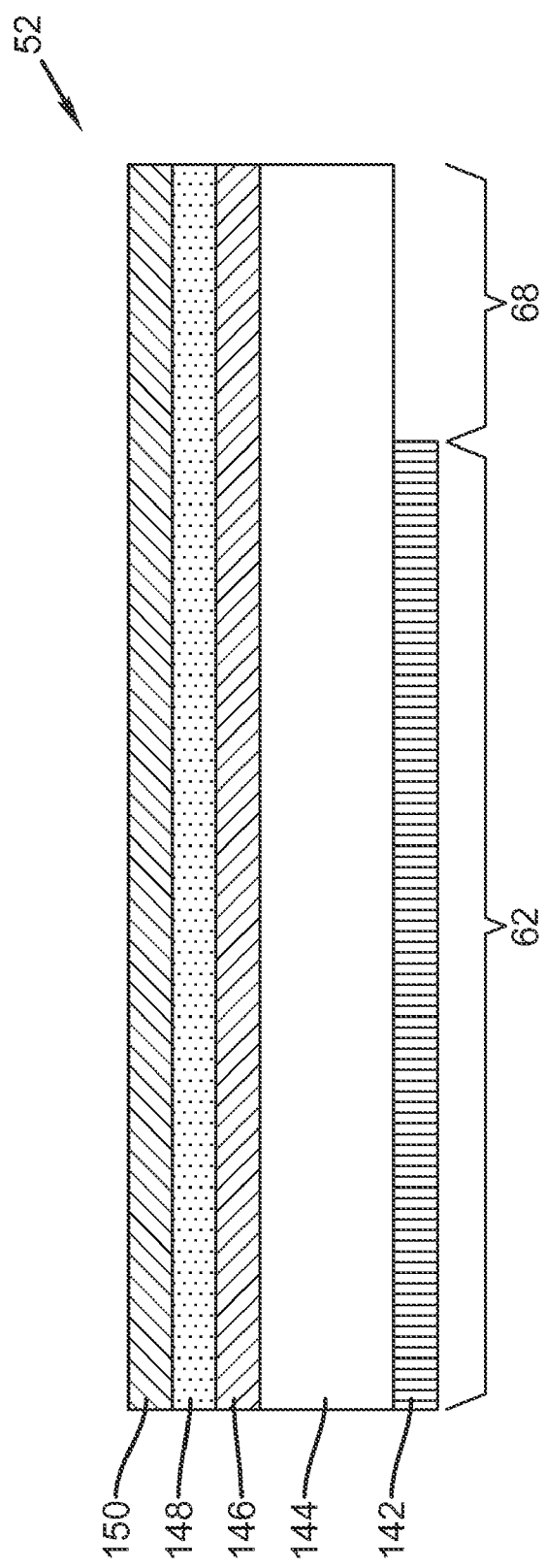
FIG. 9 is cross sectional diagram of an electroluminescent display, a portion of which is equipped with a circular polarizer.

In another embodiment, the display can be an organic light-emitting display and first portion 62 of display 52 can include a circular polarizer while second portion 68 of display 52 does not include a circular polarizer as shown in FIG. 9. FIG. 9 shows a horizontal cross-section of one embodiment of display 52 shown in FIG. 7. As shown in FIG. 9, display 52 is an electroluminescent type display that includes a substrate 144, a first electrode layer 146, an electroluminescent layer 148 and a second electrode layer 150. Additionally, display 52 includes a circular polarizing layer 142, which serves the function of a circular polarizer, circularly polarizing the ambient light as it enters the display and the light emitted within the display. This device is particularly useful in increasing the contrast of electroluminescent display devices in high ambient environments. As shown, however, circular polarizing layer 142 extends over first portion 62 of display 52 but is not provided within the second portion 68 of display 52. As typical circular polarizers can absorb as much as 66% of the light provided by the display, second portion 68 of display 52 may be higher in luminance than first portion 62 of display 52. Further, since window 66 will typically be semi-transparent, it will have some density and serve as a neutral density filter within second portion 68 of display 52 which will improve the ambient contrast of display 52 within second portion 68 of display 52.

Within such a display, processing circuitry may be provided that controls the first and second portions of the display separately, such that the processing circuitry compensates for the absorption of light by the material within window 66. Although numerous such compensation methods may be applied, one such compensation method may simply include adjusting the luminance of the second portion of the display to be equal to the luminance of the first portion of display 52 multiplied by a factor greater than 1, to compensate for the absorption of the material from which window 66 is formed.

While practically any display can be employed, it is desirable for display 52 to be formed from an emissive display technology to provide a broader range of luminance values. One such, technology that is particularly desirable is an electroluminescent display. These electroluminescent display devices can include electroluminescent layers 138 employing purely organic small molecule or polymeric materials, typically including organic hole transport, organic light-emitting and organic electron transport layers as described in the prior art, including U.S. Pat. No. 4,769,292 to Tang et al., issued Sep. 6, 1988, entitled "Electroluminescent device with modified thin film luminescent zone" and U.S. Pat. No. 5,061,569 to VanSlyke et al., issued Oct. 29, 1991, entitled "Electroluminescent device with organic electroluminescent medium". The electroluminescent layer 138 can alternately be formed from a combination of organic and inorganic materials, typically including organic hole transport and electron transport layers in combination with inorganic light-emitting layers, such as the light-emitting layers described in U.S. Pat. No. 6,861,155 to Bawendi et al., issued Mar. 1, 2005, entitled "Highly luminescent color selective nanocrystalline materials". Alternately, the electroluminescent layer 138 can be formed from fully inorganic materials such as the devices described in co-pending U.S. application Ser. No. 11/226,622 filed Sep. 14, 2005, entitled "Quantum Dot Light Emitting Layer".

Other design differences may also exist between first portion 62 of display 52 and second portion 68 of display 52. As noted earlier, it is known to include circuits within both OLEDs and LCDs for detecting changes in illumination to infer touch information. However, within these devices, two types of circuits occupy area within a backplane of display 52. That is, there are circuits for driving the pixels or light-emitting elements in the display and there are circuits for sensing illumination of display 52. Further, at least one of these circuits typically shares area with a portion of the light-emitting element. Therefore, if a touch screen is integrated into a display by employing an array of light-sensing circuits throughout the entire display, the fill factor of the pixels in the display can be significantly reduced. In liquid crystal displays, this reduction in fill factor reduces the efficiency of the display while in electroluminescent displays, this reduction in fill factor reduces the lifetime of the display. Regardless of the technology, there are negative implications of distributing these light-sensing type sensors 73 throughout the entire display 52.

Figure 10A:
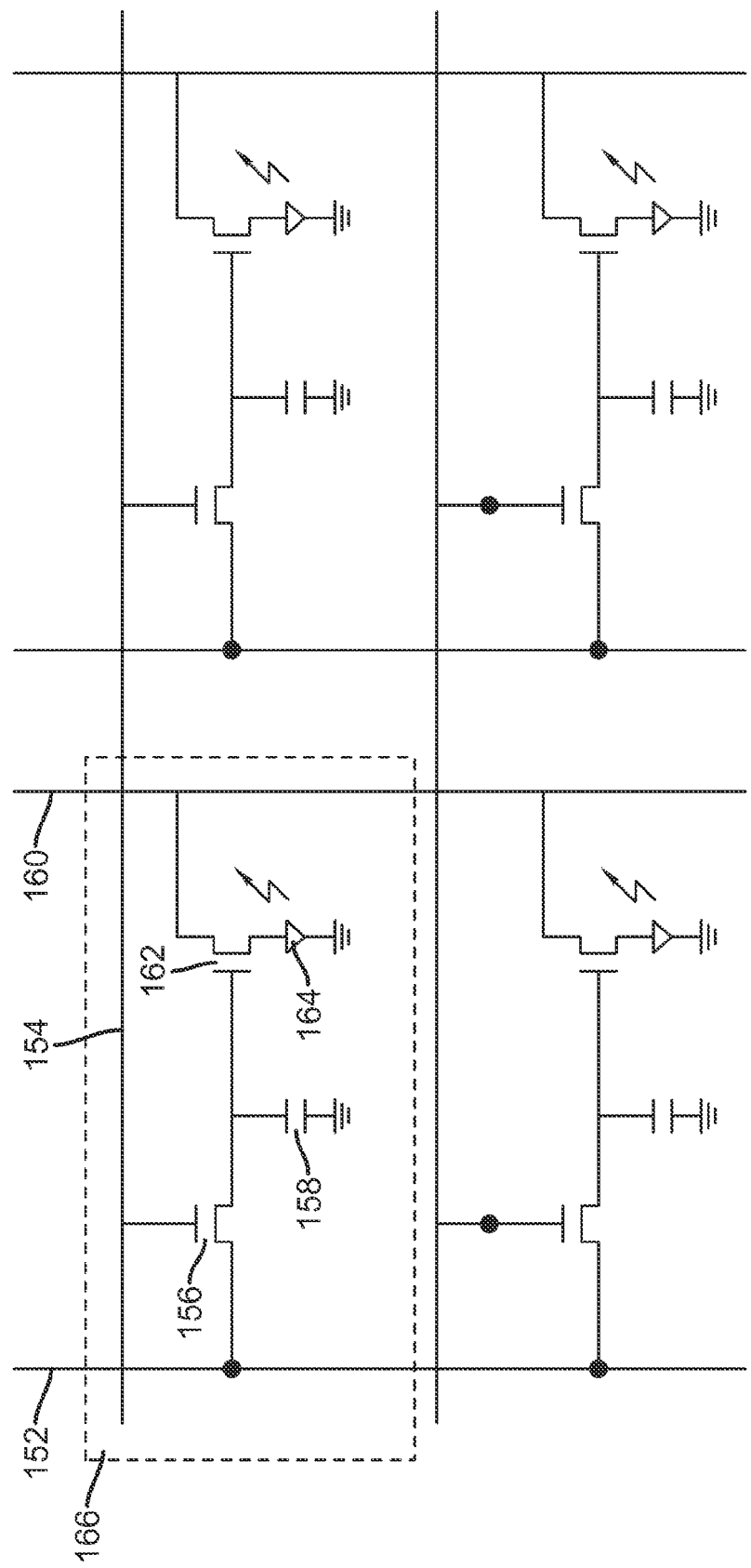
FIG. 10A shows a circuit diagram for a first portion of an electroluminescent display useful in one embodiment of a display device.
Figure 10B:
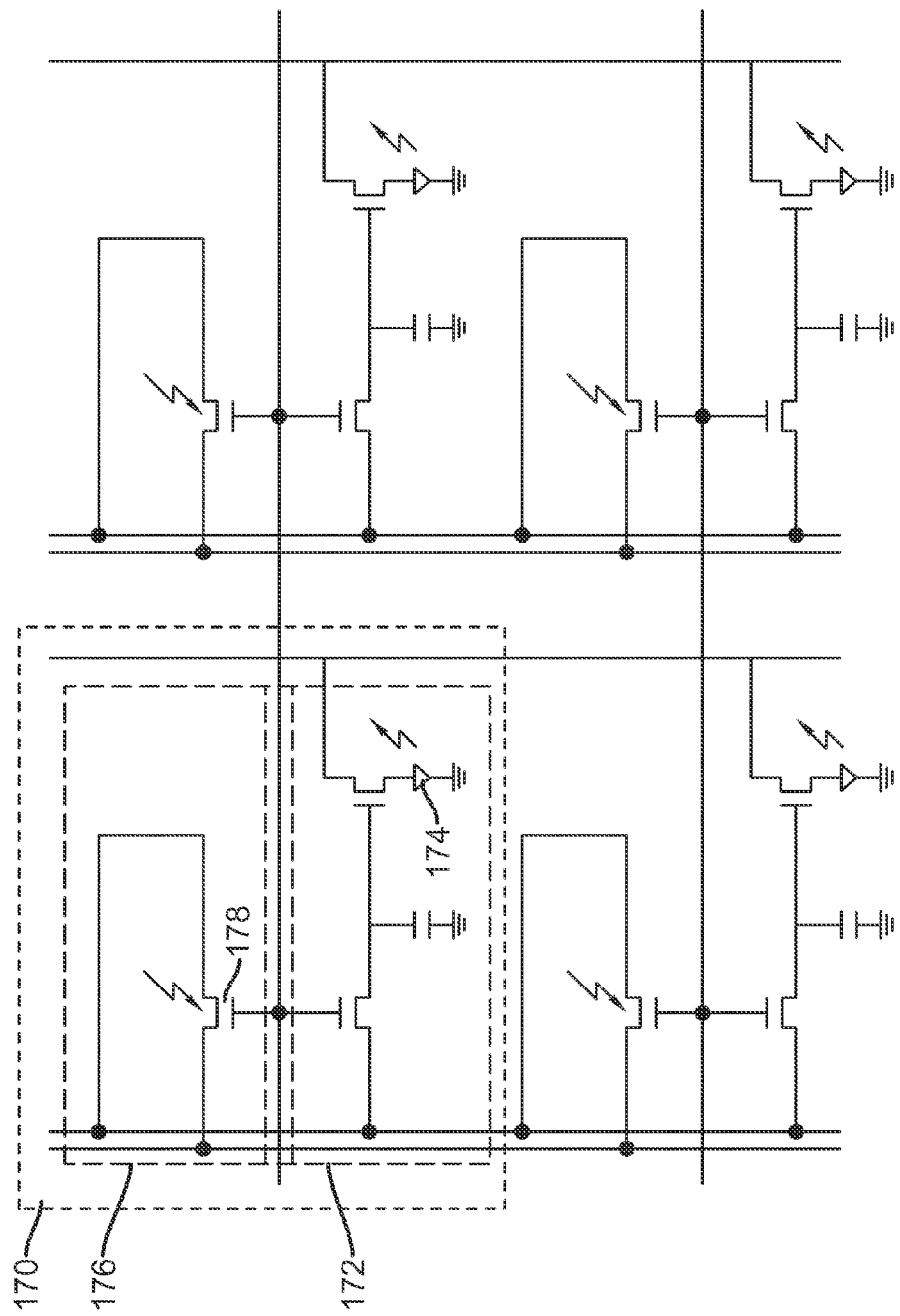
FIG. 10B a circuit diagram for a second portion of an electroluminescent display useful in one embodiment of the display device.

However, in various embodiments described herein, light-sensing type sensors 73 can be usefully employed to sense touch or to sense when a person is close to touching bezel 64, without the need to distribute the light sensing elements throughout first portion 62 of active area 54 of display 52 as it is only necessary to determine when the person touches a part of the second portion 124 of the active area of the display. Therefore, in one embodiment of the present invention, these light sensing circuits will be formed within second portion 124 of the active area of the display but not within first portion 62 of active area 54 of display 52. For example FIG. 10A shows a schematic diagram of one embodiment of circuits that can be employed within first portion 62 of display 52. As shown, the circuit for each pixel 166 each include select lines 152, which select a row of pixels to receive data, data lines 154 for providing a data signal, data transistors 156 for controlling the flow of the signal from the data lines to only pixels within a selected row of pixels, a capacitor 158 for storing this data signal, a power line 160 for providing current to drive an electroluminescent diode 164 and a drive transistor 162 for controlling the flow of current from the power line through the electroluminescent diode 164 to ground. However, the circuits to be employed within second portion 68 of display 52 can include additional components for detecting the ambient light level at each pixel. One example is shown in FIG. 10B. As shown in this figure, each pixel 170 may have an electrical circuit 172 for controlling the light-emitting or light-modulating component, such as the electroluminescent diode 174, as well as an electrical circuit 176 for controlling a light-sensing element, such as a light sensitive TFT 178. As such, a high resolution image can be displayed within first portion 62 of display 52 while a lower-resolution image can be displayed within second portion 68 of display 52, while simultaneously allowing display 52 to measure changes in light, which may be correlated with touch or near touch events.

In certain embodiments, it can be desirable to provide a sensor 73 having a structure which will be relatively difficult to visually detect so as not to detract from the appearance of bezel 64. For example, in one embodiment, sensor 73 can comprise a thermal sensor that senses infra-red light. In another example, sensor 73 can comprise an electrically conductive sensor that can sense a change in a field as an electrically charged surface, like that of a human hand is positioned close to or in contact with bezel 64. In such an embodiment, contact by a conductor such as a finger across two of the conductors completing a circuit within sensor system 72 causing a signal to be generated. In still another embodiment, sensor 73 can comprise a pattern of two or more different conductors can be applied onto the outside of bezel 64.

In one example embodiment of this type, sensor 73 can be embedded within the materials of bezel 64 or placed behind bezel 64, or coated onto bezel 64 in a manner that masks the appearance of sensor 73 without impairing the functionality of sensor 73. For example, the exterior of bezel 64 can be coated with a one dimensional array of conductors over which is coated a flexible insulator and a second painted conductive layer. As a finger touches the external, the flexible insulator can be deformed, causing a change in an electrical field created between the two conductors. Other pressure sensitive materials can also be used. For example, the surface of bezel 64 can be coated with a layer of polyvinylidene fluoride or other polymer or doped polymer materials that exhibit piezoelectric properties and electrical sensors can be attached to the surface of bezel 64 to detect current or voltage or changes in current or voltage to determine when a person touches bezel 64 and, optionally, when the person has touched the bezel.

Sensor 73 can also be located within bezel 64 or within opening 58 or window 66 as desired.

Figure 1:
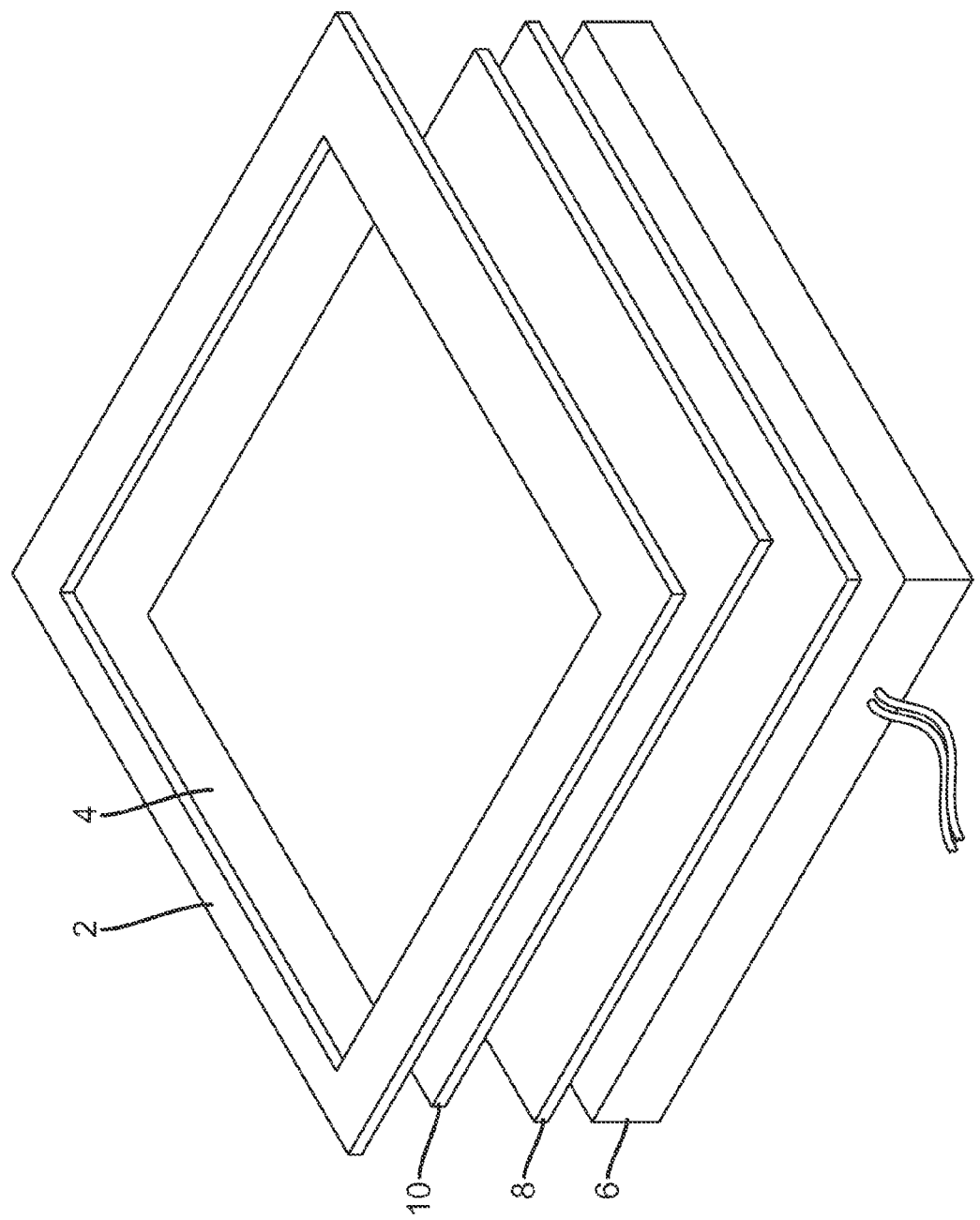
FIG. 1 is schematic diagram showing an exploded view of a prior art device employing a touch-sensitive display surface.
Figure 2:
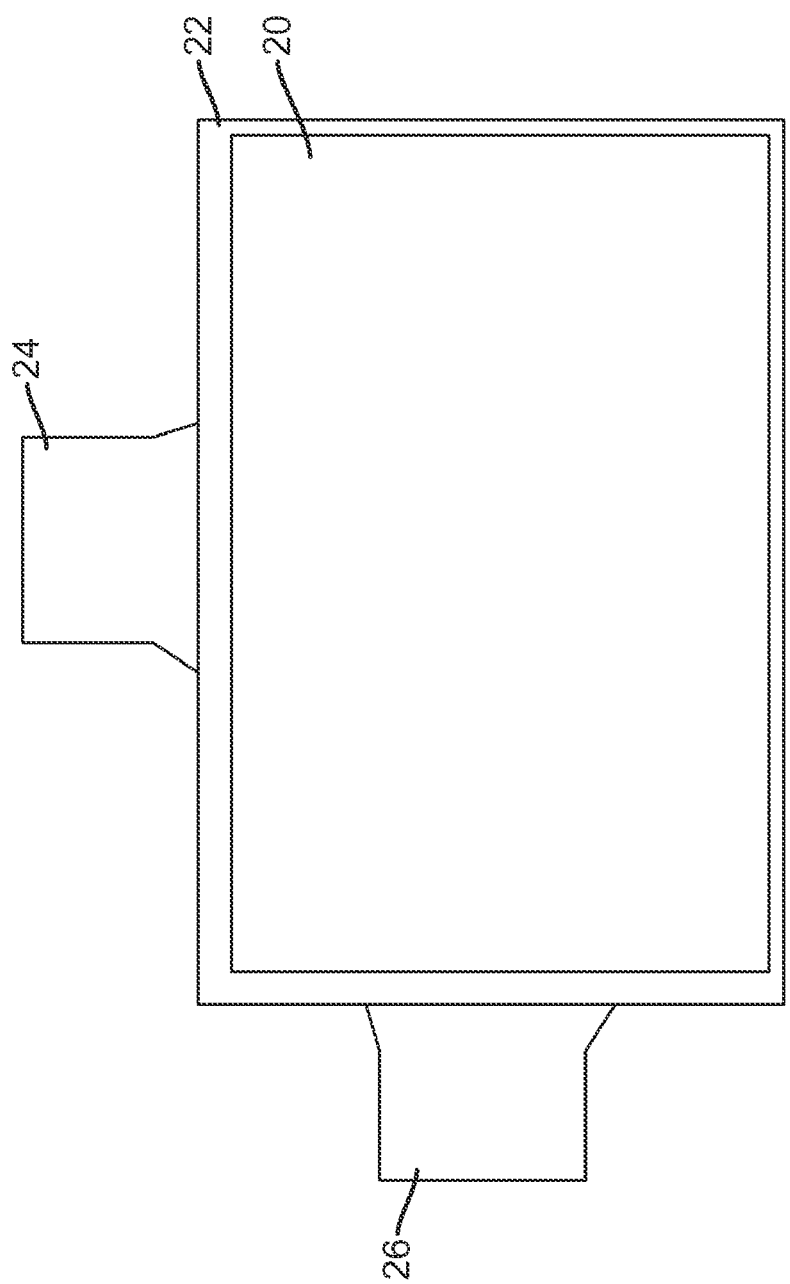
FIG. 2 schematic diagram showing a display of the prior art.
Figure 3:
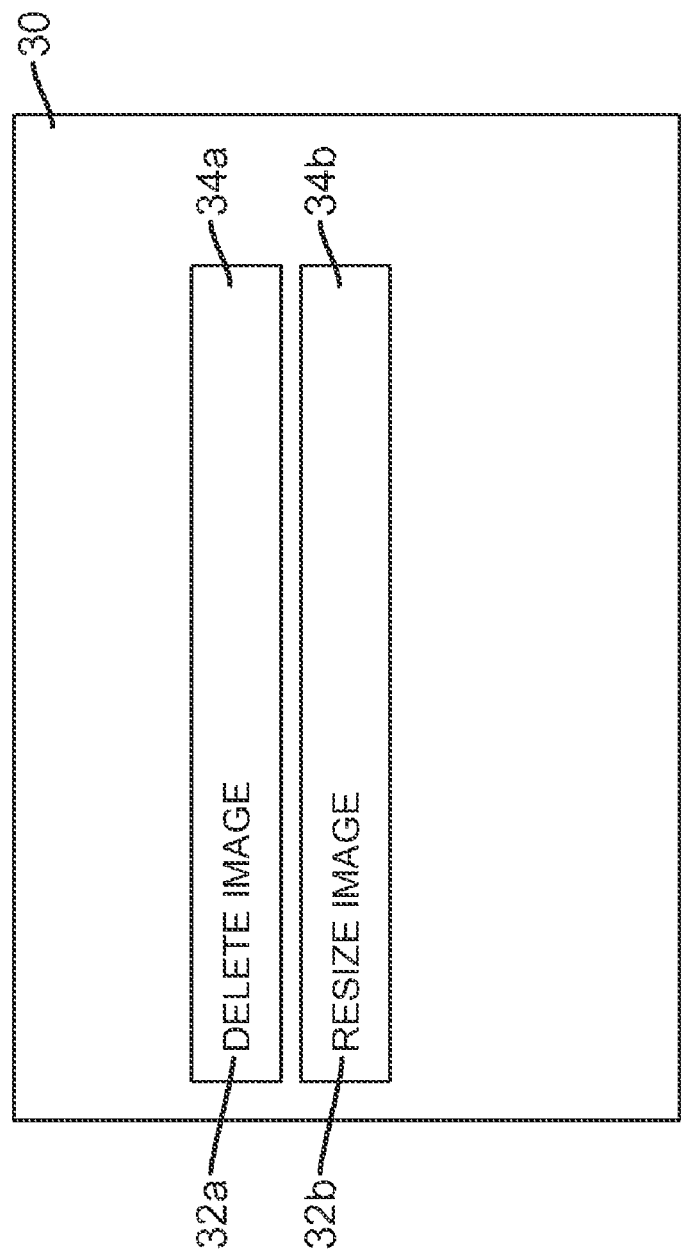
FIG. 3 depicts an example a graphical user interface useful in a prior art device employing a touch-sensitive display surface.

It will be appreciated that although the embodiment of FIG. 1 illustrates a sensor system 72 having a single sensor 73, other embodiments can employ a plurality of individual sensors 73. Electronics integrating the signals from the individual sensors can be provided by sensor system 72 or by controller 74.

The invention has been described in detail with particular reference to certain preferred embodiments thereof, but it will be understood that variations and modifications can be effected within the spirit and scope of the invention.

PARTS LIST 1 prior art touch sensitive display system
2 bezel
4 opening
6 display
8 cover plate
10 touch-sensitive overlay
20 active viewing area
22 display support
24 column driver
26 row driver
30 informational messages
32a first option
32b second option
34a first user selection area
34b second user selection area
40 display device
50 display
52 display
53 display
54 active area
55 active area
56 housing
57 area
58 opening
60 active area
62 first portion
64 bezel
66 window
68 second portion
70 electronic connection
71 power supply
72 sensor system
73 sensor
74 controller
75 proximity sensor
76 display controller
78 orientation sensor
80 detect user action step
82 presenting content step
84 determine touch before timeout step
86 disable second portion step
87 control response
88 determine touch location step
90 determine control step
92 execute function step
100 first display
102 second display
122 first portion of display
124 second portion of display
130 substrate
132 color filter
134 planarization layer
136 first electrode layer
138 electroluminescent layer
140 second electrode layer
142 polarizing layer
144 substrate
146 first electrode layer
148 electroluminescent layer
150 second electrode layer
152 select line
154 data line
156 data transistor
158 capacitor
160 power line
162 drive transistor
164 electroluminescent diode
166 pixel
170 pixel
172 electrical circuit for controlling the light-emitting or light modulating component
174 electroluminescent diode
176 electric circuit for controlling a light-sensing element
178 light sensitive TFT

The invention claimed is:

1. A display device comprising:
an electronic display having an active area for presenting visual content to a person;
a housing defining an area for holding the electronic display and having an opening allowing the person to view a first portion of the active area;
a bezel about the opening, the bezel covering a second portion of the active area and providing a window through which at least a part of the second portion can be viewed;
a sensor system having a sensor that is adapted to sense conditions from which it can be determined when the person is close to touching the bezel or to sense when the person is in touch with the bezel and to generate a sensor signal indicative of the sensed conditions;

a controller operable to receive the sensor signal and to adjust the appearance of the active area of the display in the part of the second portion that can be viewed through the window when the controller determines that the sensor signal indicates when the person has touched the bezel or is close to touching the bezel, wherein the controller is adapted to automatically deactivate the active area of the display in the viewable part of the second portion at a predetermined time interval after the controller determines the person has touched the bezel or is close to touching the bezel and one or more pixels in the active area of the display in the part of the second portion that can be viewed through the window change appearance by transitioning from a state that does not radiate light that is readily apparent to a state that does radiate light that is readily apparent when the active area of the display in the second portion is deactivated and the controller receives a signal from the sensor indicating that the person is in touch with the bezel or is close to touching the bezel.

2. The display device of claim 1, further comprising a proximity sensor that is adapted to generate a signal when the person is proximate to the display device but is not yet touching the bezel or close to touching the bezel, and wherein the signal received from the proximity sensor initiates an interaction routine when the person is positioned proximate to the display.

3. The display device of claim 1, wherein the bezel is formed from a first material, which is semi-transparent and a second material, which is not present within the window.

4. The display device of claim 1, wherein the transparency of the window within the bezel is adjustable in response to signals from the controller and is controlled to allow the window to match reflectance characteristics of the remainder of the bezel or to be semi-transparent in response to the sensor signal.

5. The display device of claim 1, wherein the sensor is positioned over the window and is sufficiently transparent to allow a portion of the active area of the display in the second portion to be viewed through the sensor.

6. The display device of claim 1, wherein the sensor includes a touch sensitive surface and wherein the display device further comprises processing circuitry configured to:
designate at least one area of the touch sensitive surface for at least one control;
to control a portion of the second portion of the active area to present a virtual control;
to obtain touch data from the at least one area of the touch sensitive surface; and
to determine if the obtained touch data invokes the virtual control.

7. The display device of claim 1, wherein the sensor system comprises a touch-sensitive surface on at least two portions of the bezel around the perimeter of the opening.

8. The display device of claim 1, wherein the display has electronic connections that extend beyond the active area on at least one side of the display but not a second side of the display and wherein the sensor system comprises a touch-sensitive surface that is located on the bezel adjacent to the second side of the display.

9. The display device of claim 1, further comprising an orientation sensor operatively connected to the controller, wherein the controller is configured to determine an orientation of the display device from orientation signals provided by the orientation sensor and to use the determined orientation to render the virtual controls.

10. The display device of claim 1, wherein the sensor system includes a touch sensitive surface and wherein the controller is configured to:
designate at least one of the areas of the touch sensitive surface for at least one control;
to adjust the appearance of a part of the second portion of the active area to present a virtual control associated with each area; and
to control a part of the second portion to minimize the transmission of luminance through these areas of the bezel when the second portion is not used to present a virtual control.

11. The display device of claim 1, further comprising an electronic display for use in an electronic device, wherein a first portion of an active area of the display is viewable through an aperture in a bezel and a second portion of the active area of the display viewable through a window in the bezel; and
wherein processing circuitry controls the first and second portions of the display separately, such that the processing circuitry compensates for the absorption of light by the bezel to make the second portion of the display readily apparent when in use.

12. The display device of claim 1, wherein a first portion of the display comprises an array of light-emitting elements having of a first set of color filter elements and wherein a second portion of the display comprising light-emitting elements which have a second set of color filter elements which are lower in saturation than the first set of color filter elements.

13. The display device of claim 1, wherein a first portion of the display comprises an array of light-emitting elements having a first set of color filter elements and wherein a second portion of the display comprises light-emitting elements without color filter elements.

14. The display device of claim 1, wherein a first portion of the display comprises an array of light-emitting elements which have a first density and a second portion of the display comprises of an array of light-emitting elements having a second density, wherein the first density is higher than the second density.

15. The display device of claim 1, wherein a first portion of the display comprises an array of light-emitting elements which output light having a first peak luminance and a second portion of the display which comprises an array of light-emitting elements which output light having a second peak luminance, the second peak luminance being higher than the first.

16. The display device of claim 1, wherein said sensor is adapted to sense a change in luminance and processing circuitry which is adapted to interpret the sensed change in luminance to infer a touch location, wherein these one or more sensors are located only in the portion of the display to be viewed through a window in a bezel.

17. The display device of claim 1, wherein the controller determines that the person has stopped interacting with display device, and can modify light emission through window so that such light emission is made in a form that actively camouflages the appearance of window or that is otherwise light emissive but less distinguishable or undistinguishable from the appearance of the other portions of bezel.

18. A method for operating a display device having a display with a first portion that is not covered by a bezel and a second portion that is partially covered by a bezel that is at least partially light transmissive, the method comprising:

detecting when a person approaches the display but has not yet touched and is not yet close to touching the bezel, and adjusting the appearance of the second portion of the display in a manner that suggests that control functions can be executed by touching the bezel;

presenting visual content on the first portion of the display in response to said detecting;

sensing when the person is touching the bezel or is close to touching the bezel;

executing a control function when it is sensed that the person has touched the bezel or is close to touching the bezel, wherein the control function includes at least causing the second portion of the display to present light in a manner that causes the appearance of the bezel covering the second portion to change; and readjusting the appearance of the second portion of the display so as to suspend the suggestion that control functions can be executed by touching the bezel when it is not sensed that the person is touching the bezel or is close to touching the bezel within a predetermined time period after detecting the person.

19. The method of claim 18, further comprising determining which of a plurality of different portions of the bezel is touched or is close to being touched and selecting from among a plurality of control functions based upon the determination.

20. A display device comprising:

an electronic display means having an active area for presenting visual content to a person;

a housing means defining an area for holding the electronic display and having an opening allowing the person to view a first portion of the active area;

a bezel means about the opening, the bezel covering a second portion of the active area and providing a window through which at least a part of the second portion can be viewed;

a sensor system having a sensor that is adapted to sense conditions from which it can be determined when the person is close to touching the bezel or to sense when the person is in touch with the bezel and to generate a sensor signal indicative of the sensed conditions;

a control means for receiving the sensor signal and to adjust the appearance of the active area of the display in the part of the second portion that can be viewed through the window when the controller determines that the sensor signal indicates when the person has touched the bezel or is close to touching the bezel, wherein the control means is adapted to automatically deactivate the active area of the display in the viewable part of the second portion at a predetermined time interval after the control means determines the person has touched the bezel or is close to touching the bezel and one or more pixels in the active area of the display in the part of the second portion that can be viewed through the window change appearance by transitioning from a state that does not radiate light that is readily apparent to a state that does radiate light that is readily apparent when the active area of the display in the second portion is deactivated and the control means receives a signal from the sensor indicating that the person is in touch with the bezel or is close to touching the bezel.

\* \* \* \* \*